UNITED STATES PATENT OFFICE 2,562,042

TETRAHYDROPYRAN-SULFIDE COMPOUNDS

Frank Kipnis, Cleveland, Ohio, assignor to American Home Foods, Inc., New York, N. Y., a corporation of New Jersey No Drawing. Application September 19, 1949, Serial No. 116,638

8 Claims. (Cl. 260—333)

This invention relates to tetrahydropyran-sulfide compounds. More particularly it relates to 2-substituted tetrahydropyranyl sulfides and their preparation by catalytic addition of one molecule of a lower alkyl or aralkyl mercaptan to one molecule of dihydropyran. By "lower alkyl or aralkyl" I mean groups containing not more than 8 carbon atoms.

The new compounds are liquids with pleasant minty aromas; they are quite stable to alkali, but are decomposed by dilute acids. They have potential value as constituents of flavoring and odor-masking compositions and as chemical intermediates.

Related oxygen ethers have been prepared, but as far as I know they have little or no practical importance. The desirable minty aroma of my compounds appears at least in part dependent on the presence of the bridge sulfur in the molecule.

I have discovered that these compounds can be made by reacting equimolar amounts of dihydropyran and a lower alkyl or aralkyl mercaptan in the presence of a small percentage of anhydrous hydrogen halide such as HCl, the reaction being initiated at ice-bath temperature (0°–10° C.) and completed at steam-bath temperature (up to 90° C.). No solvent medium is required for the reaction beyond a small amount of medium such as anhydrous ether, a convenient vehicle for the hydrogen halide. After completion of the reaction, the catalyst is neutralized, as by washing with an alkali carbonate solution, dried, stripped of volatiles and fractionated, e. g. under low pressure, preferably less than 10 mm. of Hg. The reaction may be represented by the following equation in which R is an unsubstituted alkyl (including aralkyl) group containing not over 8 carbon atoms:

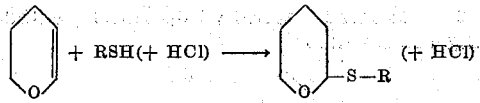

One embodiment of my invention is shown in the following example, itnended to be illustrative only and not to limit the scope of my invention, which is defined in the appended claims.

EXAMPLE

*Ethyl 2-tetrahydropyranyl sulfide.*—To a 300 ml. pressure bottle chilled in an ice bath was added 15.5 g. (0.25 mole) of ethyl mercaptan, 21 g. (0.25 mole) of dihydropyran and 5 mg. of hydrogen chloride in 1 ml. of anhydrous ether. The bottle was stoppered immediately, shaken thoroughly and the contents allowed to warm to room temperature, after which the temperature was maintained at 90° for 3 hours. At the end of this time, the bottle was chilled and opened, the contents washed into a separatory funnel with 50 ml. of ether and then shaken with 5 ml. of saturated potassium carbonate solution and separated. The organic layer was dried over calcium sulfate, filtered, and the volatiles stripped under slightly reduced pressure. The residue was fractionated through a 20 cm. Vigreux column to give a 40.5% yield of a colorless oil boiling at 42° under 2 mm. Hg pressure.

Treatment with ammoniacal sodium nitroprusside gave no coloration, indicating absence of unreacted mercaptan as well as stability of the sulfide to alkali. Treatment of the sulfide with sodium nitrite-hydrochloric acid caused the development of a red color indicative of easy hydolysis to the initial ethyl mercaptan, while an immediate pink color was given with the fuchsin-sulfur-dioxide reagent, confirming hydrolysis to the open chain hydroxyaldehyde.

The compounds listed in the following table have been made in a similar way with the yields indicated; boiling points, empirical formulas and analyses are also shown.

TABLE I

*Tetrahydropyranyl sulfides*

| R | B. P. °C | Per Cent Yield | Formula | Analysis Calculated | | | Analysis Found | | |
|---|---|---|---|---|---|---|---|---|---|
| | | | | C | H | S | C | H | S |
| Methyl | 47–8 (5 mm.) | 57.8 | $C_6H_{12}OS$ | 54.50 | 9.14 | ------ | 54.72 | 9.27 | ------ |
| Ethyl | 42 (2 mm.) | 40.5 | $C_7H_{14}OS$ | 57.49 | 9.65 | 21.92 | 67.57 | 9.99 | 21.87 |
| n-Propyl | 55–8 (3 mm.) | 36.7 | $C_8H_{16}OS$ | 59.95 | 10.06 | 20.00 | 60.09 | 9.73 | 20.74 |
| i-Propyl | 48 (2.5 mm.) | 66.7 | $C_8H_{16}OS$ | 59.95 | 10.06 | 20.00 | 59.40 | 10.23 | 20.30 |
| n-Hexyl | 84–6 (2.5 mm.) | 25.0 | $C_{11}H_{22}OS$ | 65.29 | 10.96 | 15.84 | 65.37 | 10.48 | 15.23 |
| Benzyl | 86–7 (2 mm.) | 42.3 | $C_{12}H_{16}OS$ | 69.19 | 7.74 | 15.39 | 69.59 | 8.06 | 15.43 |

I claim:
1. 2-substituted tetrahydropyranyl sulfides having the formula:

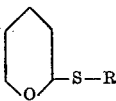

in which R is selected from the class consisting of alkyl groups and aromatic-hydrocarbon-substituted alkyl groups containing not over 8 carbon atoms.
2. Methyl 2-tetrahydropyran sulfide.
3. Ethyl 2-tetrahydropyran sulfide.
4. Propyl 2-tetrahydropyran sulfide.
5. Hexyl 2-tetrahydropyran sulfide.
6. Benzyl 2-tetrahydropyran sulfide.
7. The method of synthesizing 2-substituted tetrahydropyranyl sulfides which comprises mixing in a pressure vessel equimolecular amounts of dihydropyran and a mercaptan selected from the class of alkyl and aralkyl mercaptans containing not over 8 carbon atoms with a small amount of an anhydrous hydrogen halide catalyst at approximately 0°–10° C. in the presence of a small amount of volatile organic solvent, warming the mixture under its own equilibrium pressure to a steam-bath temperature and maintaining it at such temperature for a sufficient time to complete the reaction, neutralizing the reaction mixture, removing volatile solvent therefrom, rectifying the mixture by fractionally distilling it under vacuum, and separately recovering a 2-substituted tetrahydropyranyl sulfide fraction.
8. The process defined in claim 7 in which the hydrogen halide is HCl, the vehicle therefor is ethyl ether, the neutralization is effected by washing with an aqueous alkali carbonate solution, and the neutralized mixture is dried over a solid dehydrating agent prior to removal of the solvent and rectification.

FRANK KIPNIS.

REFERENCES CITED

The following references are of record in the file of this patent:

Karre, "Organic Chemistry," ed. 2, page 114, Elsevier, N. Y., 1946, Chem. Eng. News, 25, 2931 (1947).

Certificate of Correction

Patent No. 2,562,042 July 24, 1951

FRANK KIPNIS

It is hereby certified that error appears in the printed specification of the above numbered patent requiring correction as follows:

Column 2, line 7, for "itnended" read *intended*; lines 36 and 37, for "hydolysis" read *hydrolysis*; columns 3 and 4, in the heading to the last three columns, for "Faund" read *Found*; same table, under the heading "Found", second line, under "C", for "67.57" read *57.57*; same table, under the heading "Found", third line, under "S", for "20.74" read *20.75*; same table, under the heading "Found", fifth line, under "S", for "15.23" read *15.52*; column 4, line 43, under "REFERENCES CITED", for "Karre" read *Karrer*;

and that the said Letters Patent should be read as corrected above, so that the same may conform to the record of the case in the Patent Office.

Signed and sealed this 6th day of November, A. D. 1951.

[SEAL]

THOMAS F. MURPHY,
*Assistant Commissioner of Patents.*